April 11, 1961  A. W. GRISWOLD ET AL  2,979,068
STEP-TYPE CONTROL SYSTEM AND RELAY THEREFOR
Filed Sept. 27, 1956  2 Sheets-Sheet 1
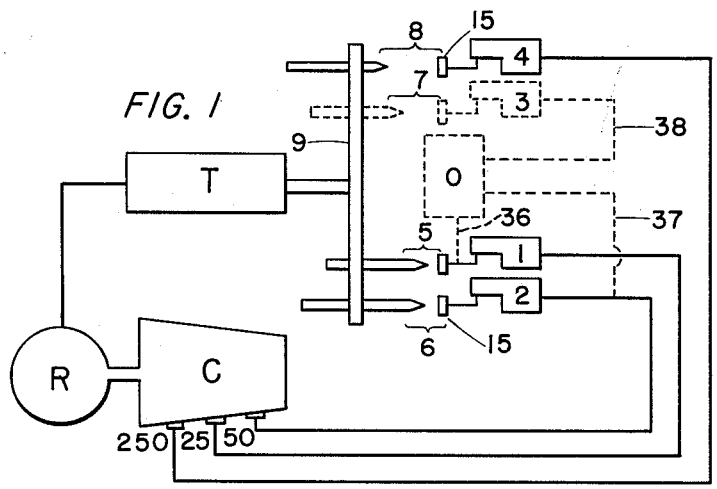
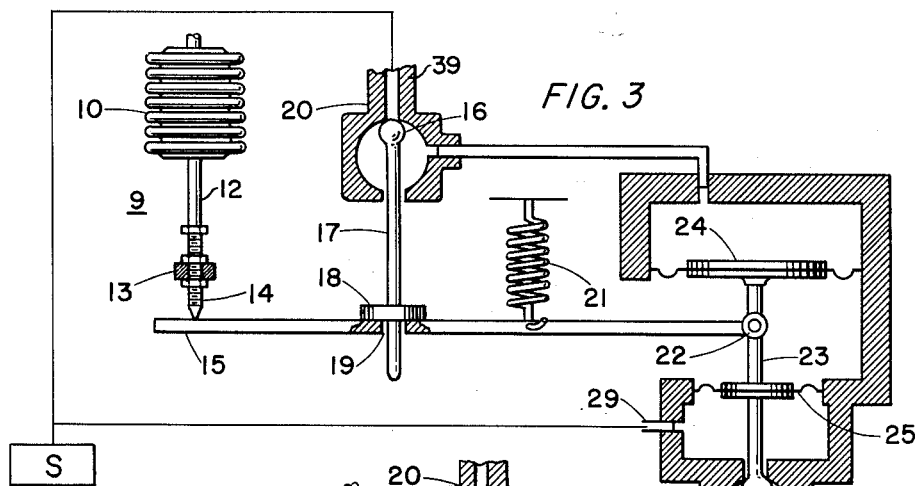
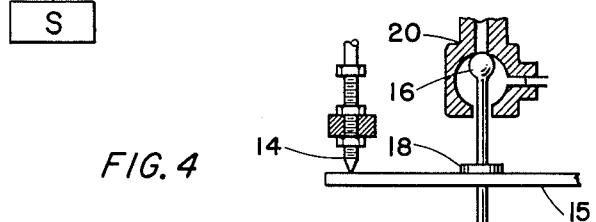
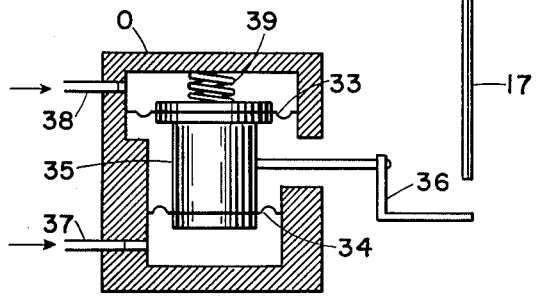
INVENTORS.
Augustus W. Griswold
Harvey A. Klumb
BY
P. J. Young, Jr.

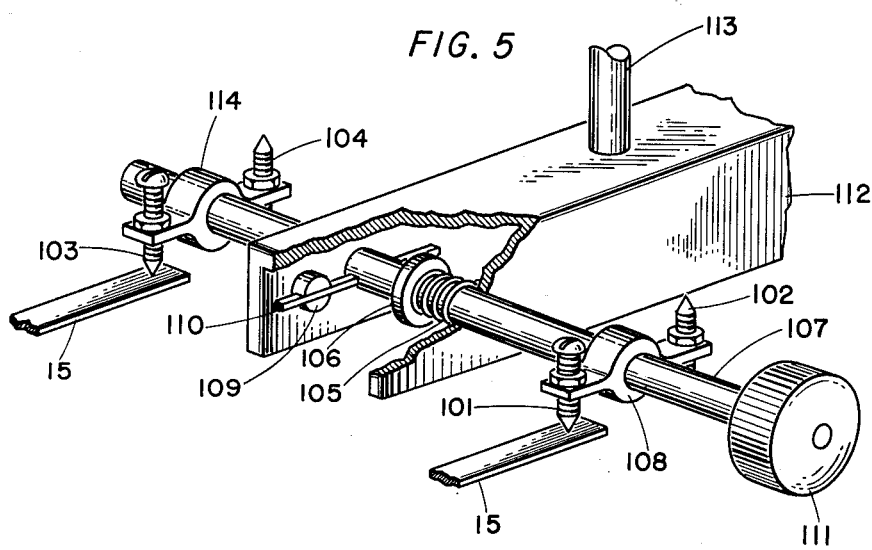
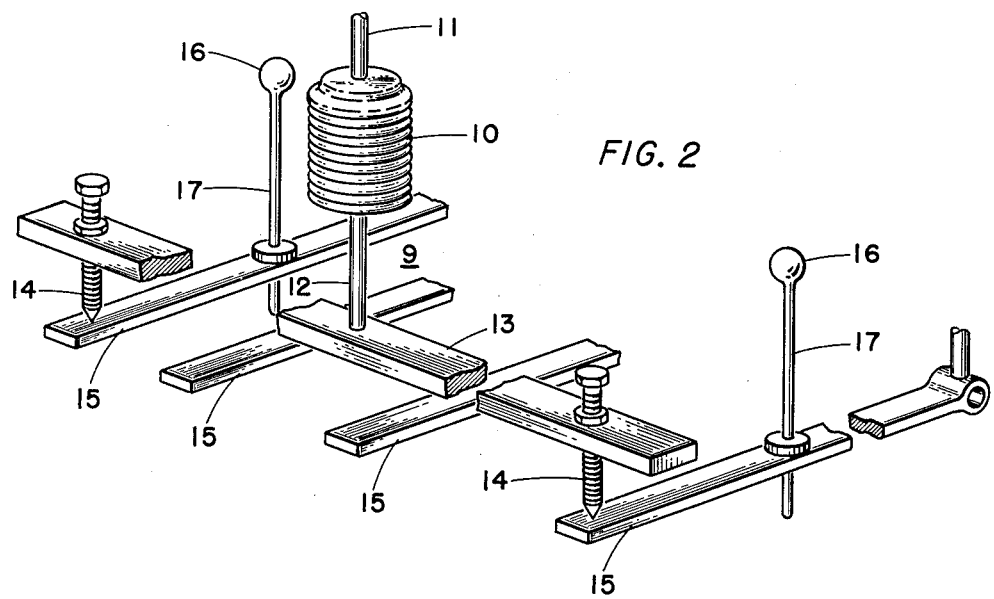

United States Patent Office 2,979,068
Patented Apr. 11, 1961

2,979,068

STEP-TYPE CONTROL SYSTEM AND RELAY THEREFOR

Augustus W. Griswold, Rochester, and Harvey A. Klumb, Pittsford, N.Y., assignors to Taylor Instrument Companies, Rochester, N.Y., a corporation of New York Filed Sept. 27, 1956, Ser. No. 612,460

13 Claims. (Cl. 137—82)

In the operation of devices in which energy is absorbed and/or generated, some kind of control of such energy is necessary for obvious reasons involving efficiency of operation, efficiency of utilization of energy, safety, etc., and to an ever-increasing extent, such control involves the interposition between an initial control action (manual or automatic) and some means directly controlling the energy developed or absorbed, of one or more intermediate devices variously known as servomotors, relays, pilots and so on. One subject of invention disclosed in this application for United States Letters Patent is one such intermediate device, namely what will be hereinafter termed a regenerative relay.

Another subject of the disclosed invention is the application of a control system utilizing a plurality of such intermediate devices (but not necessarily involving the regenerative feature) to what is commonly known as step-type control.

Finally, both for the purpose of illustrating the utility of the said system and the regenerative relay, and because of the unusual utility of the relay and control system as applied to in this particular control situation, we have chosen to disclose same as applied to compressor unloading. However, as it is obvious that such a control system is of practically universal application, it is to be understood that we do not intend the scope of protection granted for disclosed invention to be limited to a particular control situation save in the case of certain of the claims forming a part of this application that are thus limited.

Broadly speaking, the essential function of a compressor (or analogous device, such as a vacuum pump) is to maintain a predetermined fluid pressure level, usually considerably different from the ambient pressure surrounding the involved apparatus, in a "receiver" of some sort; that is, a fluid capacity of some sort. Since the pressure in the receiver depends on many factors (which are not the concern of this application) other than the inherent ability of an ideal compressor to maintain a given pressure in a hermetic receiver, it is necessary to somehow control the compressing action of the compressor to maintain a certain level of pressure in the receiver. This may be done by controlling the speed of the compressor and/or its fluid input and/or output. Control of the latter type is often termed "unloading" and involves such things as providing a variable capacity on the output of the compressor (clearance pockets) or partially by-passing fluid inlet and fluid outlet of the compressor (suction unloading), all of which is well known in the art. The usual unloading situation involves the opening and closing of valves that are exposed on one side to large and rapid fluctuations of pressure in the compressor and on the opposite to some valve operating force. In a piston type compressor, for example, the compression side or sides of the compressor may include one or more clearance pockets which may be put into or out of communication with the cylinder in which the piston operates. Thus, the output of the compressor may be decreased by opening a valve which controls communication of the cylinder with such pocket so as to decrease the compression ratio and therefore the output pressure. Likewise, the compressor may be "suction unloaded" by permitting the output of the compressor to partially exhaust back to the compressor intake. In each case, a valve must be opened or closed, and because of the aforementioned pressure fluctuations in the compressor, the valves must go from full open to full close very quickly in order to prevent pounding of the valve on its seat as the compressor runs through its pressure cycle and the valve is trying to move between full open and full close. Accordingly, the control action requires the quick and positive application or removal of a large amount of valve-actuating force in order to obviate pounding of the valve. The regenerative relay we disclose herein is admirably suited to this requirement.

As is evident from the foregoing, compressor unloading, as described above, does not lend itself readily to smooth control utilizing a throttling principle. It is understood, of course, that in certain cases, the compressor output can be modified continuously by controlling other phases of operation of the compressor. For example, running speed of certain types of compressors lends itself to smooth variation. However, where running speed control is not desired, is not practical, or does not have a sufficiently wide range of variation, in order to obtain something like a range of throttling-type control, it is the practice to supplement running speed control, or to avoid it, by providing the compressor with a plurality of unloading devices, so that the capacity or output of the compressor can be controlled by activating or inactivating the various individual devices, or groups of devices, so that there is a provided group of control points corresponding in number to the number of different control points available by operation of the unloading devices singly, and/or by operation thereof in groups of varying number and combined effect. Obviously, this situation naturally suggests step-type control. We have devised a new and useful system for carrying out this sort of control that may be applied wherever a step-type control action of this sort is required.

In the drawings:

Fig. 1 shows a more or less schematic arrangement of the control system according to the invention as applied to control of a compressor.

Fig. 2 is a detailed perspective of an actuator schematically shown in Fig. 1 for sequentially actuating relays.

Fig. 3 illustrates an example of a regenerative relay and unloader valve operator according to the invention, parts being sectioned to show detail.

Fig. 4 shows an override device and its application, its presence having been indicated schematically in dotted line in Fig. 1.

Fig. 5 illustrates a device for changing the sequence of operation of the relays of Fig. 1 in order to equalize wear on the compressor.

In Fig. 1, C is a compressor, R a receiver, and T a condition responsive translating device or system. As shown, the compressor C has a number of protuberances representing unloading devices three of which, numbered 25, 50 and 250 are shown, connected to relays 1, 2 and 4, respectively. Obviously, the number and the nature of the unloading devices are immaterial, other than to say that each is in essence a valve, operation of which changes the compressor capacity to a determinate extent.

The operation of each unloading device is controlled by a separate one of relays 1, 2 and 4, and for purposes of illustration, operation of device 25 will be assumed to cause a 25% change in capacity; device 50, 50% and device 250, 25%. These capacity change values and the number of unloading devices are more or less arbitrary and can obviously be varied in number and value when feasible and/or desirable. If, for example, compressor C had 6 unloading devices the capacity change of each would be other than 25, 50, 25, and, even with three devices only, the division 25, 25 and 50 is somewhat unlikely, unless override O shown in dotted lines was used. Relays 1, 2 and 4 are actuated in that sequence by translator T, by means of spaced pairs 5, 6 and 8 of contact members, which may be adjustable so as to vary sequence of operation of relays and/or extent of motion required of common actuator 9. Actuator 9 under control of translator T, carries one contact of each pair 5, 6 and 8 of contacts into contact with the other member of the pair, as the translator moves the actuator. The translator may be any device by which a given control action may be translated into a motion of actuator 9 bearing a desired determinate relation to the given control action. As shown, the translator T is shown connected to receiver R to sense one or more conditions therein, which condition or conditions dictate the nature of the control action desired. In practice, receiver pressure is sensed and translated into a corresponding position of actuator 9, in which case the translator may be anything from a simple pressure gauge directly operating actuator 9 to a complicated electrical, pneumatic or other relay system of which the ultimate output is a movement of actuator 9 to a position representative of the level of receiver pressure. Obviously, control action of 9 could be carried out manually or automatically in accordance with other and different conditions instead of or in addition to pressure, and prevailing within the receiver and/or elsewhere.

The operation of the system so far described is as follows: with the compressor operating, should the receiver pressure (and/or other conditions) change to sufficient extent that the compressor should be unloaded, actuator 9 advances one member of contact pair 5 into contact with the other member of the pair, upon which or very shortly thereafter relay 1 is energized to actuate unloader 25, which changes compressor capacity by 25%. Should actuator 9 advance further until contact is made between the members of pair 6, 50% more of compressor capacity is unloaded. Further change in receiver pressure ultimately unloads the last 25% of capacity when contact is made between the members of pair 8, at which time the compressor is substantially completely unloaded.

Five steps of unloading (0, 25, 50, 75, 100) can be provided by deactivating the first 25% unloading when the 50% unloader is actuated, and then reactivating the first 25% stage when 75% unloading is desired, for which reason the override pilot O, relay 3, and contact pair 7 shown in dotted line are utilized. Briefly, the operation is as follows: if actuator 9 is moved to the right, looking at Figure 1, relays 1, 2, 3 and 4 will be actuated one after the other in that order. However, if contact has been made with pairs 5 and 6 only, the output of relay 2 is fed to pilot O which acts upon relay 1 to cut off its output to its unloading device. When relay 3 operates, pilot O is again energized, this time by the output of relay 3, and reverses its effect on relay 1, so that relay 1 is again operative to actuate its unloading device, and finally relay 4 is operated to complete the unloading cycle. Should actuator 9 move left and return to its initial position, the cycle of events just described will be repeated in reverse order.

Thus, the unloading proceeds as follows:

Relay 1 comes in: 25%
Relay 2 comes in, operates pilot O as wall as unloading device 25: 25%+50%—25%=50%
Relay 3 comes in, reverses pilot O which reactivates relay 1: 50%+25%=75%
Relay 4 comes in: 50%+25%+25%=100%

Many other unloading sequences will readily occur to one skilled in the art, based on different numbers and sizes of unloading devices.

In Fig. 2 is shown a specific embodiment of actuator 9 and contact pairs 5—8. The translator output appears as the linear motion of the stem 12 of a pressure gauging element such as bellows 10 fixed to a stationary conduit 11. Pressure representative of a condition, e.g. receiver pressure, is admitted to bellows 10 via conduit 11, whereupon said bellows moves stem 12 to positions corresponding to the magnitude of the pressure therein. Stem 12 therefore moves bar 13, which is fixed thereto and which carries a number of adjustable contact devices 14 (here shown as screws with locknuts). The contact devices 14 are spaced along the length of the bar and are adjusted to different positions with respect to pilot-valve operating levers 15, the distance between levers and screws depending upon what pressure in bellows 10 it is desired to actuate a given relay. The levers 15 each cooperate with a stem 17 of a pilot-valve ball 16 or equivalent, which is biased by its own gravity or otherwise to move downward with reference to the drawing, and operate same when moved by the contact devices 14 as will be described in greater detail hereinafter. Normally, the stem 17 and ball 16 are supported by lever 15.

In Fig. 3 is shown our novel relay, and it will be seen that the lever 15, ball 16, and stem 17 are operating elements of a relay, i.e., when a lever 15 moves downward against bias of a tension spring 21, stem 17 and ball 16 follows to permit air or other fluid from a pilot valve 20 including such ball and stem to enter the relay and exert a pressure on diaphragm 24. The pilot valve 20 is conventional, say of the type designated by the reference numeral 15 in Figure 2 of U.S. Letters Patent 1,909,469 to Hubbard, or equivalent, and connected to inflate and deflate the chamber comprising diaphragm 24 analogous to the connection of the Hubbard valve mechanism 15 to diaphragm mechanism 5, and varies the ratio of supply to waste of fluid according to the position of the ball. Thus, if stem 17 is moved down the valve 20 begins to supply pressure fluid to diaphragm 24 as well as to waste it. As the stem moves, in proportion with the distance it moves more of the pressure fluid is supplied to the chamber, and less is wasted, and eventually the pressure on diaphragm 24 becomes high enough to move stem 23 downward against the upward force of pressure admitted through connection 29 to operator 27. Then, of course, the regenerative action described supra occurs. The lever 15 is connected to stem 23 which forms a more or less rigid connection of diaphragm 24, diaphragm 25 and ball 26. In this case ball 26 is a valve element or "plug" of lesser effective area than diaphragm 25, and through 29 a fluid pressure acts on diaphragm and ball, so that when the pressure admitted by pilot valve 20 to diaphragm 24 is sufficiently low ball 26 is held seated in the casing of valve 27 by the upward force due to the diaphragm 25, so that no fluid flows past the ball 26 into the valve casing. Movement down of lever 15 by contact device 14 results in deflection of lever 15 about an axis through pivoted connected 22, since stem 23 is not able to move up or down at this moment. When such deflection occurs, ball 16 moves downward to admit fluid to the relay to exert a downward force on the diaphragm 24. If the ball 16 moves far enough to permit sufficient pressure to act on the diaphragm 24, the diaphragm overcomes the forces acting upward on diaphragm 25, and stem 23 is now able to move down, thus causing the lever 15 to deflect about an axis through its point of contact with contact device 14, the result being that ball 16 will be moved further downward to again increase the pressure on diaphragm 24. Lever 15 is thus in the nature of a "floating link". In a few words, motion of the ball 16 downward results in a motion downwards of diaphragm 24 which is fed back regeneratively to the stem 17 via lever 15 to effect further downward movement of ball 16, whereupon further movement is produced in the diaphragm, which in turn causes further movement of ball 16, and so on, till supply pressure on the diaphragm is at maximum, and waste of the valve is at a minimum or has ceased. The result is that once diaphragm 24 begins to move, from then on, no more assistance is needed from the actuator 9 to actuate pilot valve 20; instead, the diaphragm, propelled by the ever-increasing supply pressure resulting from its motion, very quickly in what may be termed snap-action, moves rapidly through the full range of travel permitted it by the device it operates, in this case unloading valve operator 27. Thus, initially ball 26 prevents the supply fluid admitted at inlet 29 of the operator from passing into line 30 and hence to an unloading device which operates to reduce compressor output when actuated by pressure in line 30, and is held closed by the differential effect due to the difference in areas of ball 26 when seated and diaphragm 25, as before described. However, whenever the contact 14 has moved lever 15 sufficient to cause high enough pressure to be exerted on diaphragm 24 so as to move stem 23 downward, ball 26 begins to open, and, as the regenerative action of the relay snaps diaphragm 24 downward, ball 26 is rapidly moved to its full limit of travel, permitting full supply pressure to be applied almost at once to the unloading device. Accordingly, the time during which unloader operating pressure is at values that would permit seat pounding in the unloading device is as a practical matter nil, and no pounding results. If now, lever 15 is released by motion of actuator 9 upwards the lever under the urging of spring 21 will cause ball 16 to begin to throttle the supply of pilot valve 20 to diaphragm 24, the pressure on diaphragm 24 will decrease correspondingly, and soon diaphragm 24 will begin to move upwards, and as will be obvious, cause increased throttling in pilot valve 20 thus further lowering the pressure on diaphragm 24, and so on, till ball 26 is once again seated in full closed position and the unloader operating pressure in line 30 has vented to atmosphere or other lower pressure region through vent 31. Due to the regenerative action, ball 26 now snaps back to closed position on its upper seat in the casing of unloader valve operator 27.

As in any device converting force into motion, there must be a reactive force which determines the relation of input force to output motion, and the regenerative relay is no exception. In this case, the force at which diaphragm begins to move should be known with some exactness, remain constant in use, and small increments of force should be accompanied by large motion when motion begins. It is ordinarily attempted to solve this problem in terms of calibrated springs, snap acting movements, etc. We have, however, obviated the problem of designing and maintaining such expedients (the spring 21 of our relay is more or less a return spring, not the major determinant of relay characteristics) by an ingenious arrangement of the parts shown in Fig. 3 which permits almost universal range operation of the relay without having to resort to calibrated springs and like devices. In Fig. 3, diaphragm 25 is shown to be of lesser area than diaphragm 24, and this relation of areas, while it is not an essential feature insofar as regeneration is concerned, is highly useful in designing a desired set of operation characteristics into the relay. If the area of diaphragm 24 is twice the area of diaphragm 25 (neglecting the effect of ball 26, pilot valve 20 and operator 27 are fed by a common supply, e.g., as shown in Fig. 3, wherein the respective supply lines or connections 39 and 29 of pilot valve 20 and operator 27 are provided with a common source S of pressure fluid, and assuming the diaphragms, etc., to be substantially slack and weightless, it can be predicted with considerable certainty that diaphragm 24 will not move one way or the other until the pressure on diaphragm 24 is very little more or very little less than ½ the supply pressure. In practice, of course, area of ball 26, weight of parts, etc., must also be taken into consideration in determining the exact fraction. In any event, the diaphragm 24 (and, of course, the diaphragm 25, ball 26 and stem 23) will move very readily once the balance of forces is overcome.

Turning to Fig. 4, therein is shown an example of an override pilot, and how it is incorporated in the relay and unloader system to produce a five step (i.e., 0, 25, 50, 75, 100) unloading sequence as previously outlined utilizing two 25% unloaders and a 50% unloader and four relays. The pilot O is essentially a differential pressure device, having fluid pressure connections 37 and 38 via which pressures can be applied to diaphragms 33 and 34. The diaphragms 33 and 34, which may be provided with a spring 39, are more or less rigidly connected by stem 35, which will tend to move up or down as the force due to pressure on the one or the other of the diaphragms predominates. Motion of stem 35 is transferred to stem 17 of the pilot valve of the relay on which override is desired by means of connecting link 36. Returning momentarily to Fig. 3, it will be noted that a stop 18 supports the ball 16 and stem 17 of the pilot valve on the lever, with a portion of the stem passing through a hole 19 in the lever 15. Thus, when lever 15 is moved down, stem and ball follow, but if stem 17 is pushed upward, the stop 18 moves therewith up from the lever and no longer supports the ball and stem thereon. At this point, i.e., when lever 15 moves down, stem 17 will drop down. If it drops down far enough, the regenerative relay action will occur, and at the same time, or very shortly thereafter (since regeneration, of course, causes further movement of lever 15, and hence more leeway for downward motion of stem 17, the end of the stem approaches close enough to link 36 to permit it to be moved upward by the link far enough to start regenerative cut-off of relay unloader supply when the pressure on diaphragm 34 is sufficient to operate the pilot O. On the other hand, lever 15 can move down an amount greater than the range of movement of the ball 16, without exerting any force on the ball 16 after the lower limit of travel of the ball has been surpassed. This characteristic of the connection between stem 17 and lever 15 is of obvious advantage, since it permits the use of a common operator 9 for all the relays. However, an additional advantage lies in the fact that the impositive connection between stem and lever permits deactivation and reactivation of a relay after an initial activation thereof, and accordingly this characteristic is exploited in applying the override pilot O.

Pilot O is designed to be placed across the output of two relays, which output, it will be recalled, either is as a practical matter full supply pressure or nothing, and since it is convenient to use a common supply the pressure outputs of each relay will be identical. Hence, diaphragm 33 is of larger effective area than diaphragm 34, since it will have to overcome the force on diaphragm 34, with the connections as shown.

Returning to Fig. 1, connection 38 of the pilot O is on the output of relay 3 (pilot O is the sole load on this relay), connection 37 is on the output of relay 2, and link 36 is positioned to actuate stem 17 of relay 1. As is evident from the detail of Figs. 2 and 3, contact 14 pushes lever 15 of relay 1 down when the pressure in bellows 10 reaches a point at which 25% unloading is desired, and relay 1 acts to operate overload device 25, the stem 17 dropping into the range of movement of link 36, as pointed out above. If the pressure in the bellows reaches a point at which 50% unloading is required, relay 2 likewise operates the unloader 50, which gives an additional 50% of unloading. However, pilot O is connected by connection 37 to the output of relay 2, and the full output pressure of relay 2 is exerted on diaphragm 34, whereupon diaphragm 34, stem 35, link 36, stem 17 and ball 16, all move up, stem 17 sliding through the hole 19 in lever 15 of relay 1, thus moving ball 16 to closed position in pilot valve 20, which results in venting of the pressure on diaphragm 24 of relay 1. The relay 1 then removes its pressure loading from unloader 25 which accordingly becomes inoperative to unload the compressor, and unloader 50 only remains operative, and unloads the compressor the desired 50%.

Should 75% unloading be necessary, the contact 14 of the contact pair 7 operates lever 15 of relay 3, whereupon the relay admits full supply pressure to diaphragm 33 of pilot O via connection 38, and since diaphragm 33 is larger than diaphragm 34, and both diaphragms are acted upon by the same pressure, stem 35, link 36, and stem 17 of the pilot valve of relay 1 are moved downward, whereby relay 1 again acts to exert full output pressure on unloading device 25, which therefore operates and adds its 25% unloading to the 50% unloading of unloading device 50, and hence, the compressor is now unloaded 75%, as was desired. As will be obvious, a further 25% to completely unload the compressor will be obtained from relay 4, should there occur a further increase in the pressure in bellows 10, requiring complete unloading. Note that relay 4 could be second in the scheme of actuation and relay 3 fourth, without changing the result as follows:

Relay 1 on: 25%

Relay 4 on: 25%+25%

Relay 2 on: 25%+25%+50%−25% (output of relay 2 is fed to connection 37 of pilot O, and pilot O is connected to deactivate either relay 1 or relay 4)

Relay 3 on: 25%+25%+50%−25%−25% (output of relay 3 fed to connection 38 of pilot to reactivate the relay mechanically connected to the pilot O).

In many cases it is desired to change sequence of operation of the relays. For example, the need for unloading may ordinarily not reach the point where number 4 relay is utilized. In such case, if the compressor is a multiple piston device, or has a piston creating more than one compression during one cycle of piston operation, the piston, or part of the piston cycle, with which relay 4 is associated does not share the compressor load with the other piston or pistons, or the other part or parts of the cycle. Hence, it is desirable, in order to equalize wear on the compressor, to be able to substitute, relay 1 for example, for relay 4. A convenient arrangement for doing this is shown in Fig. 5 wherein a channeled arm 112 fixed to a stem 113, corresponding to stem 12 shown in Fig. 2, carries contact devices for two relays each controlling an unloading device of 50% unloading capacity, for example. Obviously more than two relays can be thus accommodated, having other values of unloading steps, although where the sequence change device is utilized, the override pilot described before may have to be dispensed with or, if utilized its mechanical and fluid connections to the various relays must be changed when sequence is changed. For example, this would be the case for the 25—25—50 set of unloading devices. If however, four relays (20—20—20—40) were used, obviously, two of the 20% relays could be switched about at will, since they would not be involved in the override operation.

In any event, contacts 101, 102, 103 and 104, similar to the previously described contacts 14, are carried, one on each arm of double-armed members 108 and 114 fixed to shaft 107. Shaft 107 is rotatably mounted in channeled arm 112, and spring-held in one of two angular positions 180° apart by means of a conventional detent device, which as here shown comprises a straight pin 110 fixed to shaft 107 and projecting on opposite sides thereof. A spring 105 bearing at one end against the side of the channel arm 112 and at its other end against a collar 106 fixed to shaft 107 urges one end of pin 110 into a slotted stud 109 fixed to arm 112, thus preventing the arm from rotating. In the position shown contacts 101 and 103 are in position to operate levers 15 of a pair of relays, if stem 113 is moved down. The contacts 101 and 103 are adjusted to spacings from the levers 15 corresponding to the desired order and extent of motion necessary for sequential operation of the relays associated with the levers 15. If it is desired to change the sequence of operation, knob 111 is pulled out in opposition to the force of spring 105 until the pin 110 is clear of stud 109, at which point the knob is turned until the other end of the pin can be dropped into the slot in stud 109. At this point, contacts 102 and 104 have exchanged positions with contacts 101 and 103. Accordingly, the extent of motion and the sequence of operation of the relays associated with levers 15 will be dependent on the spacings between levers 15 and contacts 102 and 104. For example, the spacing of contact 104 may correspond with the spacing of contact 101, and the spacing of contact 102, with that of 103, so that reversal of sequence of operation may be had, without tampering with the contacts themselves, merely by turning a knob.

In certain of the claims, the term "main valve" is used to distinguish the valve 27 from pilot valve 20, and the terms "expansible chamber" and "expansible and contractible chamber" are used to describe the various disclosed diaphragm devices in terms of their essential functional characteristics.

Having set forth the principles of our joint invention in full detail as to principles of operation and essentials of consruction, together with examples of its application to a particular field of control, we conclude our specification and define the scope of protection we desire for the various features of our disclosed invention by claiming:

1. In combination, a main valve, a pilot valve, and first and second expansible and contractible chamber devices, said pilot valve being supplied with pressure fluid and having a control element movable in one given sense or in another given sense respectively to admit or exhaust said pressure fluid respectively to or from said first expansible and contractible chamber device, said main valve being connected to said first expansible and contractible chamber device to be moved correspondingly by expansion or contraction thereof, said first expansible and contractible chamber device being connected to said control element to move same in said given sense concurrently and only with said main valve in such manner that if the said control element is initially moved so as to admit pressure fluid to said first expansible and contractible chamber device, said first expansible and contractible chamber device expands and moves said control element so as to admit pressure fluid to said first expansible and contractible chamber device, whereby movement of said main valve by said first expansible and contractible chamber device is accelerated; said second expansible and contractible chamber device being connected to said first expansible and contractible chamber device and adapted to be connected to a source of pressure fluid for expanding in opposition to expansion of said first expansible and contractible chamber device, whereby movement of said main valve by said first expansible and contractible chamber device is controllable by pressure in said second expansible and contractible chamber device.

2. The invention of claim 1, wherein the said second expansible and contractible chamber device comprises a pressure chamber having one wall thereof constituted as a flexible diaphragm means, said pressure chamber having a pressure fluid inlet and a pressure fluid outlet; said main valve compriisng an outlet-closing member exterior to said pressure chamber; means connecting said outlet-closing member, said diaphragm means and said first expansible and contractible chamber device together so that pressure in said first expansible and contractible chamber device exerts a force tending to move said outlet-closing member away from said outlet, and pressure in said pressure chamber exerts both a force on said diaphragm means counter to the first said force and a force on said outlet-closing member aiding said first said force, the effective area of said outlet-closing member acted upon by pressure in said pressure chamber when said outlet is closed being less than the effective area of the said diaphragm means.

3. The invention of claim 1 wherein the said second expansible and contractible chamber device is of lesser effective area relative to pressure acting thereon, than is said first expansible and contractible chamber device; said pilot valve and said second expansible and contractible chamber device having a common connection to which pressure fluid may be supplied for the purpose of preventing movement of said main valve by said first expansible and contractible chamber device until the pressure in said first expansible and contractible chamber device is to the pressure in said second expansible and contractible chamber device as the said lesser effective area is to the effective area of said first expansible and contractible chamber device.

4. In combination, a plurality of relays, each relay having a control element operable in one or the other of two senses to cause corresponding operation of said relay, operation of said relay in said one sense producing a valve closing effect, and operation of said relay in the said other sense producing a valve opening effect; a plurality of main valves, each main valve being connected to one of said relays to be closed or opened upon operation of the said control element of its associated relay in said one or the said other sense, respectively; relay-operating means for operating said control elements sequentially and individually in said one of said senses; over-ride means for causing at least one of said main valves to close or open after having been respectively opened or closed due to operation of one or more of said control elements in one of said senses, said over-ride means comprising means responsive to opening or closing of one of said main valves to operate in the other of said senses a control element of a relay that has already been operated in said one of said senses so as to have respectively opened or closed another of said main valves prior to the respective opening or closing of said one of said main valves.

5. The invention of claim 4 including a further relay, said further relay being connected to said over-ride means for reversing operation as aforesaid of said over-ride means, said relay having a control part operable in sequence with the control elements of said plurality of relays subsequent to said opening or closing of said another of said main valves so as to cause said further relay to reverse said operation of said over-ride means, whereby following operation of said control part, all main valves whose relay control elements have been operated in the said one sense are uniformly closed, or uniformly open.

6. The invention of claim 5 wherein said relays are of the type wherein a pressure is produced or not produced in the operation of each depending on whether the control element thereof is operated respectively in said one sense or in said other sense, and said over-ride means includes a first pressure responsive means connected to receive pressure from the relay, operation of which relay in the said one sense results in opening of the said another of said main valves, said over-ride means including a second pressure responsive means connected to receive pressure from said further relay, and both said pressure responsive means being connected together so that relay pressures exerted thereon are opposed; said first pressure responsive means having a lesser effective area than said second pressure responsive means, and both said pressure responsive means being connected to the control element of the relay connected to the said another of said main valves for operating the last said control element in the other of said two senses in response to the pressure produced by the relay connected to said one of said main valves, whereby if said control part is actuated to cause said further relay to supply a pressure to said second pressure responsive device, the said last said control element will be operated by said over-ride means in the said one of said two senses.

7. A relay device comprising a pair of chambers each having a wall movable in response to variation pressure within the chamber, a stem interconnecting one said wall with the other said wall for opposing the tendencies of said walls to move when a pressure variation of the same sense occurs in each chamber, supply means for supplying both said chambers with pressure fluid from the same source of pressure fluid, first means connecting said supply means with one of said chambers and second means for connecting said supply means with the other of said chambers, said first means including valve means operable in response to a variable condition to vary the pressure fluid supplied to said one of said chambers, and the said movable wall of said other of said chambers being of lesser effective area relative to the pressure acting thereon than the said movable wall of said one of said chambers, whereby unless said valve means is operated so as to cause the pressure in said one of said chambers to vary in amount such that the last said pressure is substantially just greater than the pressure in said other of said chambers multiplied by the ratio of the smaller said effective area to the larger said effective area, the tendency of the said wall of said wall of said smaller effective area to move in response to pressure will predominate, whereas if said last said pressure is substantially just greater as aforesaid, the tendency to move in response to pressure of the said wall of said larger said effective area will predominate.

8. The invention of claim 7 including feedback means connecting said wall of larger effective area to said valve means for operating said valve means so as to increase the pressure in said one of said chambers when the said wall of larger effective area moves in response to pressure in said one of said chambers becoming substantially just greater as aforesaid.

9. In combination, a first relay having a control part biased for motion in a given direction, a lever in contact with said control part and preventing said motion when in contact with said control part, condition responsive means responsive to a given value of a condition for moving said lever out of contact with said control part so as to permit said motion to occur, said relay being adapted to produce operating energy when said motion occurs; second and third relays each having a control part movable in a given sense to produce operating energy, the control part of said second relay being movable in said given sense by said condition responsive means when said condition has a value different from said given value, and the control part of said third relay also being thus movable but upon occurrence of a value of said condition such that said given value is between the other mentioned values; and override means responsive to simultaneous production of operating energy by said second and third relays to reverse the said motion of said control part of said first relay in the event that all three values of said condition have occurred.

10. The invention of claim 9 wherein said first relay includes means responsive to said operating energy, when the latter is produced by said relay, to move said lever, and said lever is arranged so that motion thereof in consequence of production of said operating energy aids in moving said lever out of contact with the said control part of said first relay.

11. The invention of claim 10 wherein said lever has one end thereof pivotally interconnected with said means responsive to said operating energy for motion of the former by the latter, said condition responsive means includes a movable contact element arranged to move into contact with the other end of said lever upon occurrence of said given value and to move said other end of said lever, said movable contact element being arranged to move in the direction in which said control part of said first relay is biased to be moved, whereby movement of said lever by said contact element is accompanied by movement of the last said control part; said override means including a member movable into contact with the last said control part for moving said last said control part upon simultaneous production of operating energy by said second and third relays, the direction of such movement being opposite to that in which the last said control part is biased to move.

12. A regenerative relay having in combination a device adapted to transfer energy to a receiver at different rates dependent on the position of a movable part of said device, a receiver adapted to receive said energy, said receiver being responsive to translate said energy into movement, a floating lever, a first end-portion of said lever being connected to said receiver to be moved thereby, said first end-portion being biased to resist movement by said receiver, an intermediate portion of said lever being positioned to obstruct motion of said movable part, said movable part being biased into engagement with said lever so that there occurs a change in position of said part if said intermediate portion is moved, said movable part being mounted for motion independently of said lever otherwise, the arrangement being such that the position of the said intermediate portion can be changed by deflecting said lever so as to allow said movable part to move in accordance with the bias on said movable part and, due to the bias on said lever, without appreciably affecting the position of the said first end-portion, a second end-portion of said lever being arranged to have a lever-deflecting force applied thereto so as to move said intermediate portion in accordance with the bias on said movable part, so that if the position of the said first end-portion is changed while a force is applied to said second end-portion, a change in position of the said intermediate portion results; said device being so constructed and arranged as to increase the rate of energy supply to said receiver in response to movement of said movable part in accordance with its said bias from said one position to said another position; means for applying said lever-deflecting force to said lever so as to cause said device to increase transfer of energy to said receiver so as to cause said receiver to overcome the bias on said lever, whereby said first end-portion is moved to deflect said lever; the said receiver, in response to increased transfer of energy thereto, being positioned to move said first end-portion against said bias on said lever, so as to move said intermediate portion and cause said movable part to move in accordance with its said bias from one said position to another, whereby there results a further increase in rate of transfer of energy to said receiver, and hence, an accelerated movement of said first end-portion of said lever due to the regeneration effected by initial movement of said first end-portion by said receiver.

13. The invention of claim 12 wherein said receiver is an expansible and contractible chamber and said device is a pilot valve connected to said chamber for supplying fluid under pressure to said chamber and releasing fluid under pressure from said chamber, depending on the position of a movable valve element of said pilot valve whereby the said energy is that of fluid under pressure; said movable valve element constituting the aforesaid movable part of said device; and said expansible and contractible chamber being connected to the aforesaid first end-portion of said floating lever, the arrangement being that expansion and contraction of said expansible and contractible chamber moves said first end portion of said lever, as aforesaid.

References Cited in the file of this patent

UNITED STATES PATENTS

| | | |
|---|---|---|
| 1,817,862 | Wainwright | Aug. 4, 1931 |
| 2,034,272 | Schroeder | Mar. 17, 1936 |
| 2,285,540 | Stein et al. | June 9, 1942 |
| 2,308,214 | Stegelity et al. | Jan. 12, 1943 |
| 2,337,582 | Wineman | Dec. 28, 1943 |
| 2,420,159 | Wineman | June 6, 1947 |
| 2,455,329 | Cook | Nov. 30, 1948 |
| 2,484,000 | Macgeorge | Oct. 4, 1949 |
| 2,630,824 | Eckman | Mar. 10, 1953 |
| 2,633,858 | Eckman | Apr. 7, 1953 |
| 2,637,301 | Burdick | May 5, 1953 |
| 2,672,151 | Newbold | Mar. 16, 1954 |
| 2,675,818 | Gallo et al. | Apr. 20, 1954 |
| 2,733,608 | Smoot et al. | Feb. 7, 1956 |
| 2,755,812 | Garnett | July 24, 1956 |
| 2,767,725 | Long | Oct. 23, 1956 |
| 2,769,453 | Du Bois | Nov. 6, 1956 |
| 2,775,231 | Silver | Dec. 25, 1956 |
| 2,776,670 | Hunt | Jan. 8, 1957 |
| 2,917,026 | Hall et al. | Dec. 15, 1959 |